Patented Aug. 23, 1927.

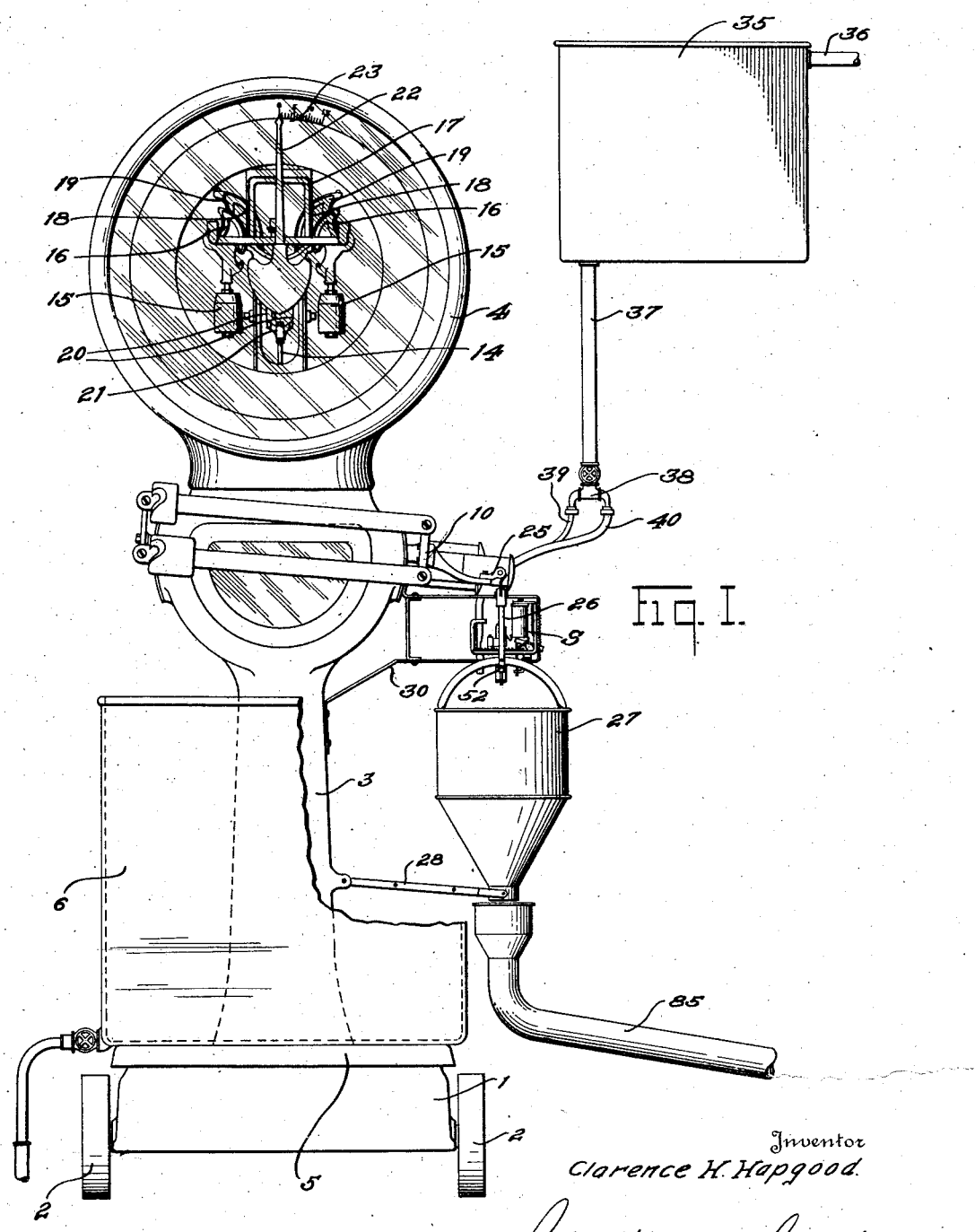

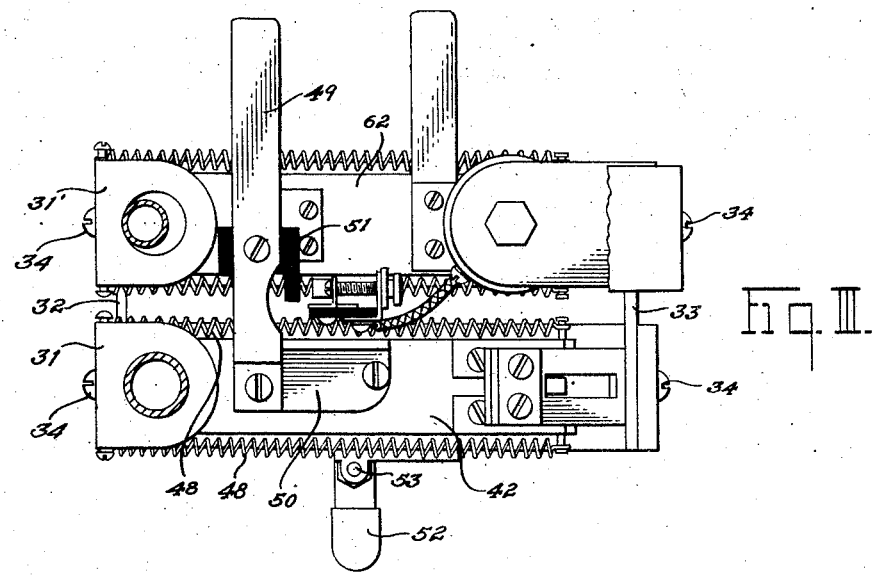
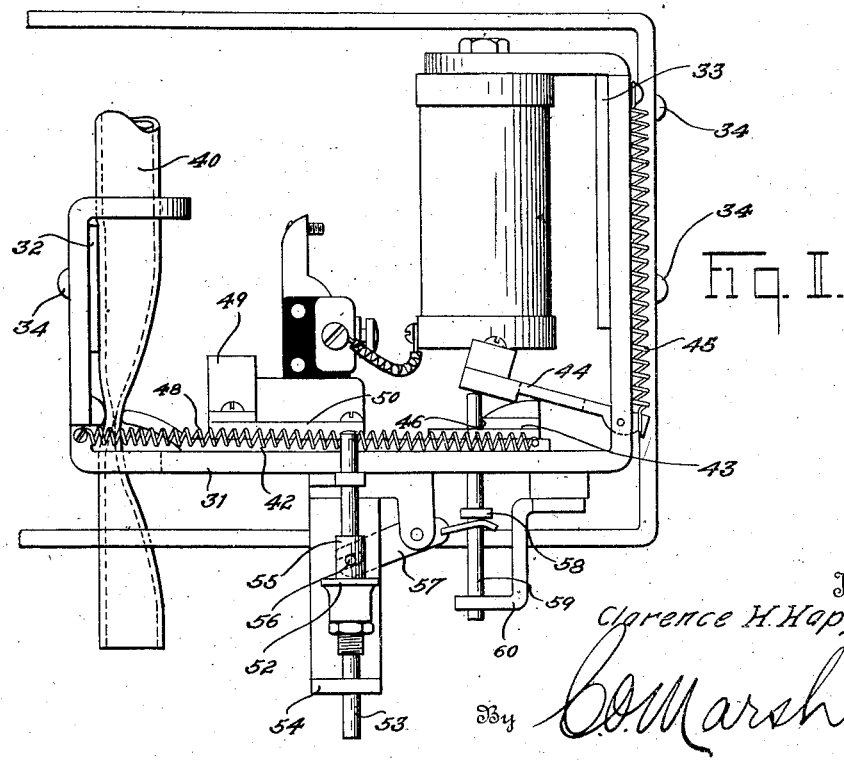

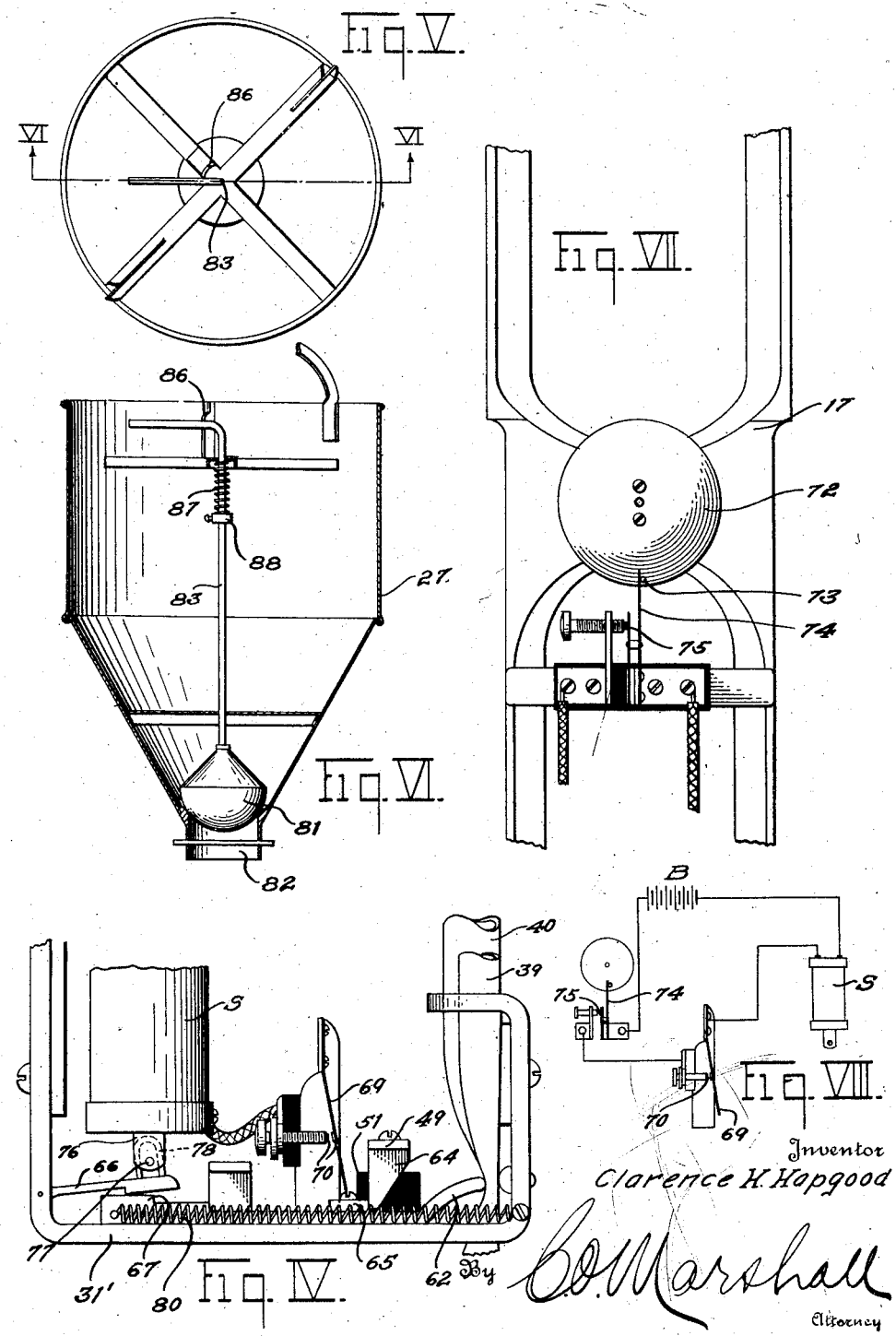

1,640,073

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 13, 1924. Serial No. 737,568.

This invention relates to weighing scales, and more particularly to means for returning the load-counterbalancing and indicating mechanism of automatic scales to zero position without removing the load from the scale. In many commercial establishments, such as dairies, receipts of commodities from many persons are deposited in the same commodity receptacle or tank and it is desirable that means be provided to indicate instantly the weight of the individual deposits and to indicate when desired the accumulated weight in the receptacle. In many manufacturing establishments it is desirable to weigh individually ingredients as they are added to a compound, and it is desirable, where possible, to avoid weighing such ingredients in separate receptacles.

It is one of the principal objects of this invention to provide a scale which while under load will automatically indicate individually the weights of additional loads placed upon it and will also when desired indicate the total weight on the scale.

Another object is the provision of an automatic scale having novel means for returning the load-counterbalancing and indicating mechanism to zero position while the scale is under load.

Another object is the provision of a weighing-in scale which will automatically indicate the weights of individual deposits and also when desired the total weight in the receptacle.

Another object is the provision of an automatic scale in which the automatic load-counterbalancing and indicating mechanism may be returned to zero position while the scale is under load by counterbalancing the load by means of a flowing counterbalance, the flow of which is automatically cut off at the proper time to bring the indicating mechanism to zero position.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of a scale of the so-called automatic portable type illustrating the application of my invention thereto;

Figure II is an enlarged view of the fluid cut-off operating mechanism forming a part of my invention;

Figure III is a top plan view of the mechanism shown in Figure II;

Figure IV is an enlarged elevational view from the rear side of the fluid cut-off operating mechanism;

Figure V is a top plan view of the fluid container or receptacle;

Figure VI is a transverse sectional elevational view through the fluid receptacle;

Figure VII is an enlarged view of a switch and supporting frame forming one element of my invention; and Figure VIII is a diagrammatic view of the wiring system employed.

Referring to the drawings, I have shown my invention as incorporated in a weighing scale of the portable type, but it is to be understood that my invention is applicable to other types of scales. As the scale illustrated is not per se the subject of this application, I will describe it only in such detail as will suffice for a clear understanding of the application of my invention thereto. The scale proper consists of a base 1 adapted to house and support lever mechanism (not shown), and mounted upon the rear thereof is a column 3 surmounted by a watch-case-shaped housing 4. The scale base is provided with a plurality of wheels 2 so that it may be easily moved about.

The lever mechanism in the base supports a platform 5 which in turn supports a tank or container 6 adapted to receive liquid or granulated material to be weighed. The platform lever mechanism is connected by means of a link (not shown) to an intermediate lever 10 which in turn is connected by means of a rod 14 to the load-counterbalancing mechanism. This mechanism consists substantially of pendulums 15 provided with fulcrum sectors 16 which are suspended from a frame 17 by means of flexible metallic ribbons 18. The pendulums are also provided with power sectors 19 and the power sectors are connected by means of ribbons 20 to a yoke 21 fixed to the upper extremity of the rod 14. The pendulum mechanism is suitably connected by means of rack and pinion mechanism (not shown), to an indicator hand 22 which co-operates with a graduated chart 23 to indicate the weight of a load in the container 6. The load-counterbalancing mechanism illustrated and briefly explained herein is more particularly described and claimed in my Patent No. 1,203,611, issued November 7, 1916.

It will be apparent from the foregoing that a load placed in the container 6 exerts a downward force upon the rod 14 and the ribbons 20, causing the pendulums to swing outwardly and upwardly to offset the load on the platform. As the lever 10 is also connected to the weighing mechanism, it is caused to oscillate in a counter-clockwise direction whenever a load is placed in the container 6.

The re-setting device for returning the pendulums and indicating hand to zero or initial position after the completion of a weighing will now be described. The lever 10 is provided with a bracket 25 having a pivot from which is suspended a container or receptacle 27, the lower extremity thereof being substantially funnel-shaped to provide a restricted outlet from said receptacle. Undue oscillation of the receptable is prevented by means of a check link 28, and lines joining the pivotal points of the link 28, the fulcrum of the lever 10 and the point from which the container is suspended form a parallelogram, thus maintaining the container in a vertical position throughout weighing movements.

Obviously, if fluid or other material be introduced into the container 27 after a load has been placed upon the platform, the effect will be to counterbalance the weight of the load to return the pendulums and the indicating hand to zero position. To insure an accurate return of the indicating hand to zero position, it is necessary that the flow of the counterbalancing fluid into the receptacle 27 be cut off at the proper moment.

The fluid cut-off mechanism is supported upon a bracket 30 fixed to the column 3 of the scale, and consists substantially of a frame formed of a pair of metal strips or bars 31 and 31' fixedly connected by a pair of plates 32 and 33 and secured to the bracket 30 by means of screws 34. The fluid, preferably water, is stored in a supply tank or reservoir 35 having an inlet pipe 36 and an outlet 37, the latter branching, as at 38, into smaller outlet tubes 39 and 40 preferably fabricated of rubber or other flexible material for a purpose hereinafter explained. These tubes pass through apertures in the metal strips and terminate at a point just above the receptable 27.

In a great many establishments where such a scale is used, especially in dairies, time is an important factor in weighing in. It is, therefore, necessary that the pendulums and indicating hand be returned to zero position as rapidly and accurately as possible. To attain the desired results I have constructed the tubes of different diameters.

The tube 40, being of larger diameter, permits a comparatively large quantity of water to enter the receptacle, but the flow of liquid through this tube must be cut off before the indicator reaches a zero position, the flow of liquid through the smaller tube 39 being cut off at precisely the time to cause the indicator to stop in zero position. The valve or means for shutting off the flow of liquid through the tube 40 comprises a member 42 adapted to slide longitudinally upon a horizontal portion of the metal strip 31, one end of which is so formed as to engage the tube 40, the other end being provided with a block 43. A trigger 44 acting under the influence of a spring 45 tends to engage a projection 46 of the block 43 and prevent the engagement of the member 42 with the flexible tube 40. The sliding member 42 is resiliently retained under the influence of the contractile springs in engagement with the tube 40 until the operator of the scale grasps the handle 49 fixed to a bracket 50 forming a part of the member 42 and moves said sliding member longitudinally to a position where the trigger 44 engages the projection on the block 43, thus preventing a retraction of said member.

The operator moves the slide member and associated mechanism after he has recorded the weight of the load upon the platform, which movement disengages the member 42 from the tube and permits fluid to flow into the receptacle 27. As material is introduced into the receptacle the latter is moved downwardly and the lower extremity of the rod 26 connecting the bail of the receptacle to the bracket 25 engages with a finger 52 fixed to a vertically movable shaft 53 slidably received in openings in a bracket 54 fixed to the metal strip 31. An enlarged portion 55 of the shaft 53 is provided with a laterally projecting pin 56 which is loosely received in a slot in the end of a lever 57 pivoted to a projection on the bracket 54. The other end of the lever 57 is normally in juxtaposition to a collar 58 fixed on a plunger 59 slidably positioned in openings in a bracket 60 and member 31. When enough fluid has been introduced into the receptacle 27 to bring the indicator almost to a zero position, the finger 52, having been moved downwardly by the rod 26 to a point sufficient to cause the end of the lever 57 to engage the collar 58, moves the plunger 59 upwardly to engage the trigger 44, tripping same, and permitting the sliding member 42 to be impinged against the exterior walls of the flexible tube 40, thus cutting off the flow of fluid into the receptacle 27 through the tube 40, the position and relation of the parts being shown in Figure II.

The mechanism for cutting off the fluid supply from the tube 39 will now be described. The frame member 31' supports a slidable member 62 similar to the member 42 and a projection 64 on the handle 49 engages a block 65 fixed to the member 62 when the handle is manipulated by the operator, thus moving the members 42 and 62 simultaneously in the same direction. A trigger 66 pivoted to the frame member 31' is adapted to automatically engage a raised portion 67 on the slidable member 62, thus restraining said member from retrograde movement. As the arm 49 is moved by the operator, an insulating block 51 fixed to the member 62 engages a flexible metallic strip 69 and effects closing of the contact points 70 of a switch connected in series with a solenoid coil S. Fixed upon the rear end of the shaft upon which the indicator hand 22 is mounted is a disk 72 (see Figure VII) which is provided adjacent its periphery with a pin 73 normally contacting with an arm 74 of a switch and holds the contact points 75 in engagement.

When the indicator hand reaches zero, the pin 73 engages the arm 74 to close the contact points 75, and, as the contact points 70 have been previously closed by movement of the arm 49, the circuit through the solenoid S is complete. When the coil S has been energized by means of the current from the battery B the armature 76 is caused to move upwardly and a pin 77 on the armature engages the bight of a loop 78 fixed to the trigger 66 and releases the latter, the contractile springs 80 simultaneously moving the sliding member 62 into engagement with the flexible tube 39 to cut off the ingress of fluid into the receptacle 27.

The solenoid S is immediately deenergized as the insulating block 51 has moved away from engagement with the flexible strip 69, thus opening the circuit at the contact points 70, and the indicator being at zero the scale is now in condition to weigh additional loads. The weight of each successive load may be noted and recorded as it is weighed and the fluid counterbalancing mechanism employed after each weighing to return the load-counterbalancing and indicating mechanism to zero or initial position.

The tank 6 soon becomes filled with milk or other material, and, as it is usually desirable to have a record of the total weight of milk, I have provided a means for emptying the receptacle 27, comprising a valve ball 81 normally adapted to close the opening 82 in said receptacle, which is provided with a rod 83, the upper extremity being bent at right angles to the major portion thereof. By grasping the bent portion of the rod 83 and partially rotating and elevating the rod 83, the valve ball 81 is moved away from its seat and the liquid is permitted to flow away through a waste pipe 85 and the indicator hand moves to a position indicating the total weight in the tank 6. A stop 86 is provided to prevent the return of the rod 83 to its normal position, and an expansive spring 87 exerting a force against the collar 88 tends to keep the valve ball 81 in its seat when the rod 83 has been moved away from the stop 86.

In using the scale for compounding, the first ingredient is poured into the receptacle in sufficient quantities to bring the indicator hand to the position indicating the proper weight of that ingredient. The indicator hand is then returned to zero position and the next ingredient similarly added, etc., the hand being returned to zero after the addition of each ingredient. When the batch is complete the total weight may be readily ascertained.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, automatic load-counterbalancing mechanism, indicating mechanism connected thereto, a fluent load counterbalance, and means for applying said fluent counterbalance in substitution for said automatic load-counterbalancing mechanism.

2. In a device of the class described, in combination, automatic load-counterbalancing mechanism, indicating mechanism connected thereto, a fluent load counterbalance, means for applying said fluent counterbalance in substitution for said automatic load-counterbalancing mechanism and thereby causing said indicating mechanism to approach zero position, and means for cutting off said fluent counterbalance at the proper time to bring said indicating mechanism to zero position.

3. In a device of the class described, in combination, automatic load-counterbalancing mechanism, indicating mechanism connected thereto, a fluent load counterbalance, means for applying said fluent counterbalance in substitution for said automatic load-counterbalancing mechanism, means for restricting the flow of said fluent counterbalance as said indicating mechanism approaches zero position, and means for cutting off the flow of said fluent counterbalance at the proper time to bring said indicating mechanism to zero position.

4. In a device of the class described, in combination, weighing mechanism including automatic load-counterbalancing and indicating mechanism, fluid counterbalancing means for re-setting said load-counterbalancing and indicating mechanism to an initial position, and means for activating said fluid means after the completion of a weighing.

5. In a device of the class described, in combination, a container for receiving articles to be weighed, automatic load-counterbalancing mechanism, and fluid counterbalancing means for re-setting the load-counterbalancing mechanism to an initial position after successive weighings.

6. In a device of the class described, in combination, weighing mechanism including automatic load-counterbalancing mechanism, and fluid counterbalancing means for re-setting said load-counterbalancing mechanism to an initial position after the completion of a weighing.

7. In a weighing scale, in combination, a commodity-receiver for receiving articles to be weighed, automatic means for counterbalancing and indicating the weight of said articles, and means comprising a fluid counterbalancing device for re-setting said load-counterbalancing and indicating mechanism to an initial position after each individual weighing.

8. In a weighing scale, in combination, a commodity-receiver for receiving articles to be weighed, automatic means for counterbalancing and indicating the weight of said articles, means comprising a fluid counterbalancing device for re-setting said load-counterbalancing and indicating mechanism to an initial position after each individual weighing, and means for bringing the indicating means into position to indicate the total weight of said articles after a number of individual weighings have been effected.

9. In a device of the class described, in combination, automatic weighing mechanism including lever mechanism, and fluid means for re-setting said lever mechanism to an initial position after weighings have been completed.

10. In a device of the class described, in combination, weighing mechanism including automatic load-counterbalancing and indicating mechanism, means for re-setting said load-counterbalancing and indicating mechanism to an initial position comprising a fluid, a tube through which said fluid may flow, and means for cutting off the flow of said fluid from said tube when said load-counterbalancing and indicating mechanism has reached the initial position.

11. In a device of the class described, in combination, weighing mechanism including automatic load-counterbalancing and indicating mechanism, means for re-setting the load-counterbalancing and indicating mechanism to a predetermined position comprising a receptacle connected to said mechanism, a fluid adapted to flow into said receptacle, and means actuated by said load-counterbalancing and indicating mechanism for restricting the flow of said fluid when said mechanism has reached its predetermined position.

12. In a device of the class described, in combination, weighing mechanism including automatic load-counterbalancing and indicating mechanism, means for re-setting the load-counterbalancing and indicating mechanism to a predetermined position comprising a receptacle connected to said mechanism, a fluid adapted to flow into said receptacle, electrically actuated means for cutting off the flow of said fluid, and means whereby said cutting off means is actuated when said load-counterbalancing and indicating mechanism has reached a predetermined position.

13. In a device of the class described, in combination, weighing mechanism including automatic load-counterbalancing and indicating mechanism, means for re-setting the load-counterbalancing and indicating mechanism to a predetermined position comprising a receptacle connected to said mechanism, a fluid adapted to flow into said receptacle, means whereby the flow of said fluid is partially restricted as said load-counterbalancing and indicating mechanism approaches a predetermined position, and means whereby the flow of said fluid is cut off as said mechanism reaches the predetermined position.

14. In a device of the class described, in combination, weighing mechanism including automatic load-counterbalancing and indicating mechanism, means for re-setting the load-counterbalancing and indicating mechanism to a predetermined position comprising a receptacle connected to said mechanism, a fluid adapted to flow into said receptacle, means whereby the flow of said fluid is partially restricted as said load-counterbalancing and indicating mechanism approaches a predetermined position, means whereby the flow of said fluid is cut off as said mechanism reaches the predetermined position, and means for emptying said fluid receiving receptacle.

15. In a device of the class described, in combination, automatic weighing mechanism including indicating mechanism, a re-setting device for said indicator including a receptacle, a fluid adapted to flow into said receptacle, and means actuated by movement of the indicator hand to restrict the flow of said fluid when said indicator has reached a predetermined position.

CLARENCE H. HAPGOOD.